Figure 1:
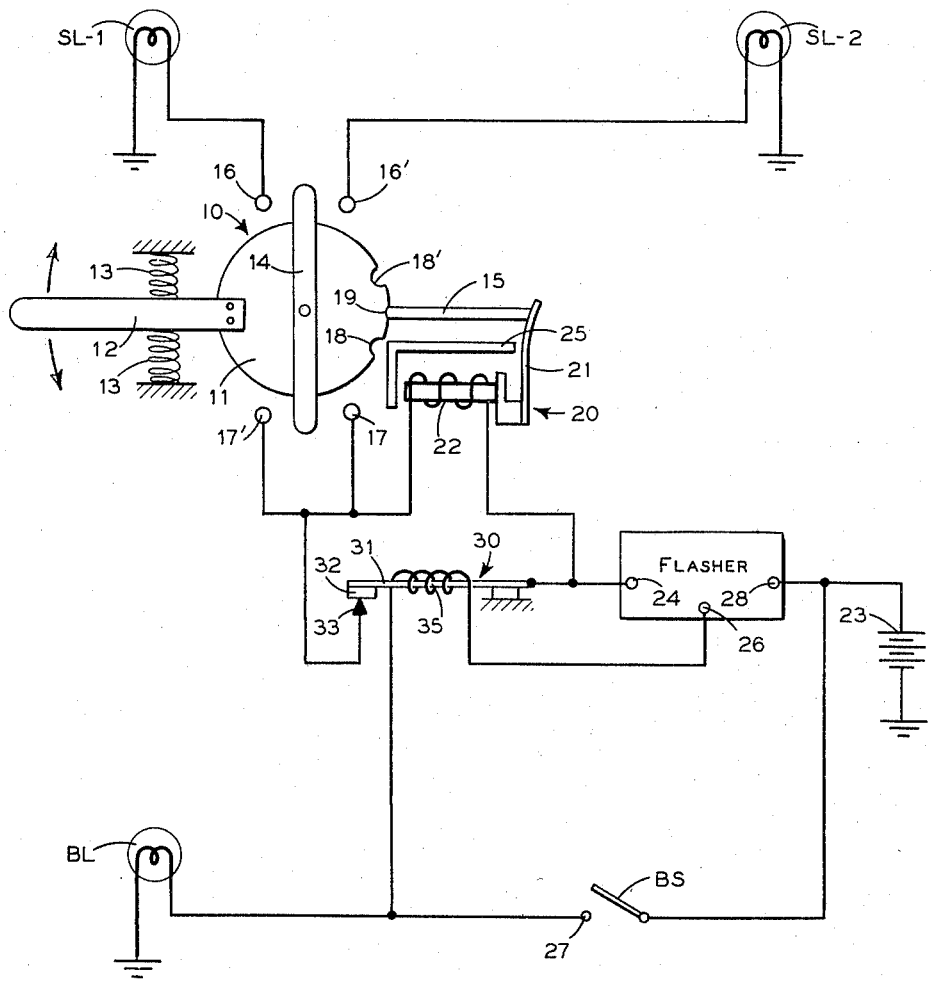

Dec. 2, 1958
J. R. HOLLINS
2,863,096
AUTOMOTIVE VEHICLE SIGNALING SYSTEM AND
SELECTOR SWITCH THEREFOR
Filed Sept. 6, 1956
2 Sheets-Sheet 1
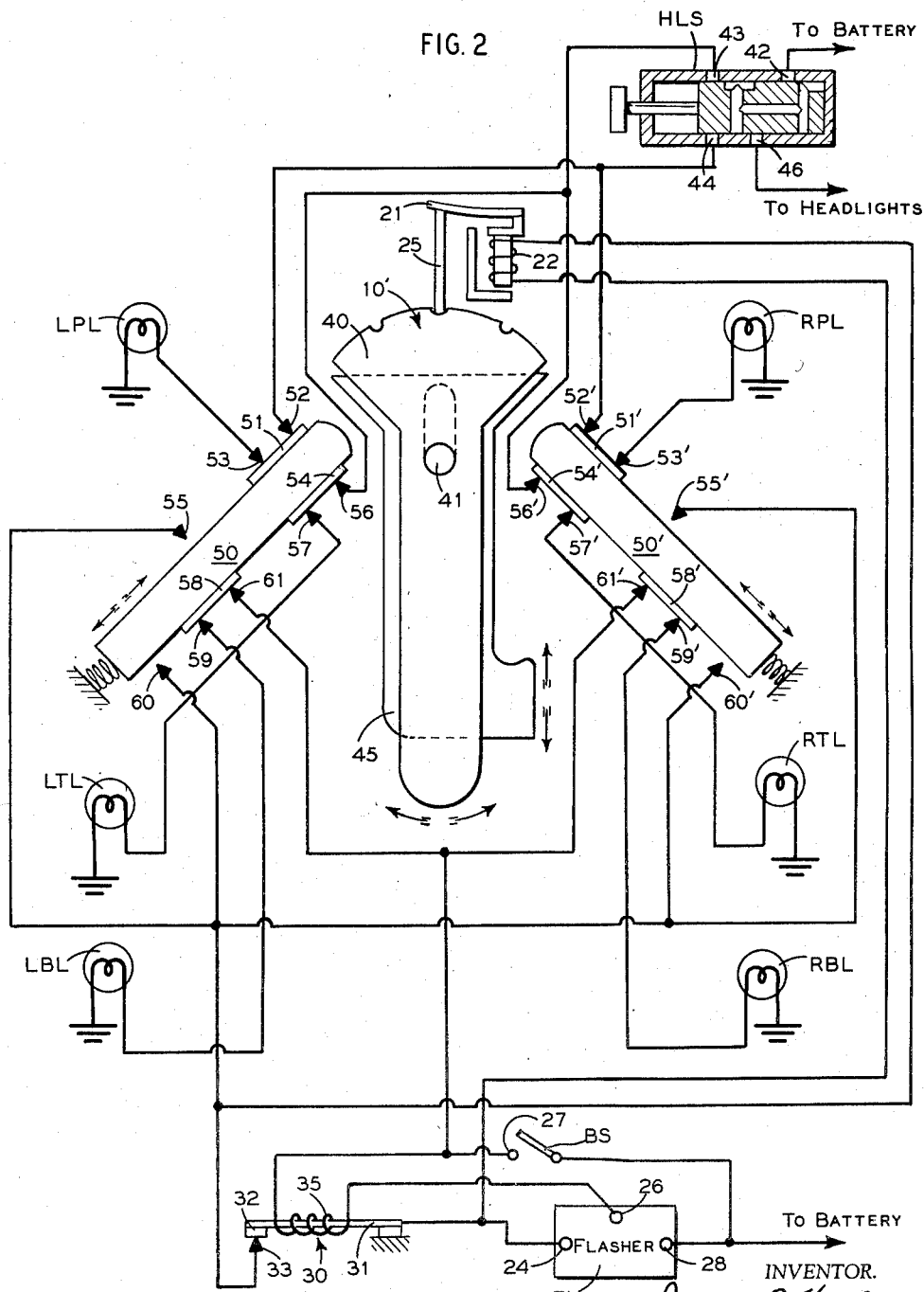
INVENTOR.
Jesse R. Hollins
BY
ATTORNEY Dec. 2, 1958　　　　J. R. HOLLINS　　　　2,863,096
AUTOMOTIVE VEHICLE SIGNALING SYSTEM AND
SELECTOR SWITCH THEREFOR
Filed Sept. 6, 1956　　　　　　　　　　　　2 Sheets-Sheet 2

INVENTOR.
Jesse R Hollins
BY
ATTORNEY

United States Patent Office 2,863,096
Patented Dec. 2, 1958

2,863,096

AUTOMOTIVE VEHICLE SIGNALING SYSTEM AND SELECTOR SWITCH THEREFOR

Jesse R. Hollins, Brooklyn, N. Y., assignor, by mesne assignments, to Abraham Hollins and Jesse R. Hollins, Brooklyn, Lewis S. Hollins, Great Neck, and Theodore D. Davidson, New York, N. Y.

Application September 6, 1956, Serial No. 608,377

7 Claims. (Cl. 315—83)

This invention relates to turn signalling arrangements for automotive vehicles and, more particularly, to a novel turn signal selector switch releasably latched in either operated position by a magnetically released latch means under the operative control of thermostatic time delay means.

In my United States Patent No. 2,757,315, issued July 31, 1956, I have illustrated, described and claimed a novel turn signalling arrangement for automotive vehicles comprising a switch including an operator which, when moved to a switch closing position, is automatically latched therein by magnetizable latch means continuously biased to an operator latching position and moved to an operator releasing position upon energization of electromagnetic means operative upon the latch means.

Energization of the electromagnetic means is under the control of a pair of thermostatic devices, one associated with each operated position by the switch. The heating circuit of a selected one of these devices is closed responsive to movement of the switch operator to either operated position. After pre-set heating time, the energized thermostatic device effects operative energization of the electromagnetic means and the latter then attracts the magnetizable latch means to release the switch operator. Return of the latter to the neutral position breaks the heating circuit for the thermostatic device which, upon cooling, opens the circuit for the electromagnetic means.

The arrangement further includes means for shunting the heating circuit for the thermostatic devices whenever the brakes of the vehicle are applied.

The present invention is directed to a simplified signalling system of the general type shown in my aforesaid patent but requiring only a single thermostatic means. In accordance with the invention, a spring biased latch releasably maintains the turn signal switch in the neutral or either operated position. Adjacent the latch is a relay having a movable armature which, when the relay is energized, strikes the latch support a series of blows due to the cycling action of a flasher in circuit, to move the latch to the release position so that spring means may bias the turn signal switch back to the neutral position.

The relay coil is connected in shunt with a normally closed thermostatic switch connected in series between a flasher and the turn signalling switch. The thermostatic switch is provided with a heating winding connected between the "pilot" terminal of the flasher and the "brake" or "dead" terminal of the usual brake operated switch controlling the brake or stop lamps.

The system operates in the following manner. When the turn signal switch is moved to either operated position, the latch engages in a recess to latch the switch. At the same time, the switch connects a grounded signal lamp to the flasher through the thermostatic switch. With the flasher thus energized, its "pilot" terminal is periodically connected to the battery thus periodically energizing the heating element. During this period, the relay coil is shunted by the closed thermostatic switch.

After a predetermined period of heating, the thermostatic switch opens, removing the shunt from the relay coil. The relay coil is now intermittently fully energized by the flasher, resulting in the relay armature initiating the striking of a blow or a series of blows against the latch spring to release the latch. The intermittent action of the flasher is utilized for creating the desired repetitive striking action of the relay armature. The turn signal switch is now biased back to neutral, opening all circuits.

For an understanding of the invention principles, reference is made to the following descriptions of typical embodiments thereof as illustrated in the accompanying drawings. In the drawings:

Fig. 1 is a schematic wiring diagram of a simple signal system embodying the invention; and Fig. 2 is a schematic wiring diagram illustrating the invention as incorporated in an automotive vehicle turn signal system using the parking and brake lamps as turn signal lamps.

Referring to Fig. 1, a turn signal switch 10 is illustrated as comprising an oscillatable disk 11 having an operating handle 12 secured thereto and biased by springs 13 to a neutral position. A conductive strip 14 is fixed to extend diametrically of disk 11 and therebeyond at either end to selectively engage and interconnect contacts 16, 17 or 16', 17'. Disk 12 has peripheral notches 18, 18' separated by a shallow peripheral depression 19. A latch 15 is engageable with notches 18, 18' in either operated position of switch 10, and with depression 19 in the neutral position.

Latch 15 is biased toward disk 12 by a leaf spring 21 forming part of the core of relay 20 having an operating winding or coil 22 and a movable armature 25. When coil 22 is energized armature 25 strikes spring 21 to retract latch 15.

A flasher FL is connected to the ungrounded terminal of the usual grounded vehicle battery 23, this terminal also being connected to normally open brake-operated switch BS controlling energization of brake lamp BL which is lit when the brakes are applied. The main output terminal 24 of flasher FL is connected to one end of a thermostatic switch 30 including a thermostatic or bimetallic strip 31 carrying a contact 32 normally engaged with a fixed contact 33 connected to contacts 17, 17'. A heating winding 35 is wound on strip 31 and is connected at one end to the "pilot" terminal 26 of flasher FL and, at the other end, to the open contact 27 of switch BS. Coil 22 of relay 20 is connected in shunt with switch 30.

When handle 12 is moved counter-clockwise to signal a right turn, strip 14 engages contact 16 to connect lamp SL–1 to contact 17, and latch 15 snaps into notch 18. Lamp SL–1 is energized as follows: battery 23, flasher input terminal 28 and output terminal 24, switch 30, contacts 33 and 17, strip 14, contact 16, lamp SL–1 and ground. If brake switch BS is open, as when no brakes are applied, heating winding 35 is energized intermittently from the "pilot" lamp terminal 26, the resistance of winding 35 being so tight that lamp BL is not lit. After a preset interval, member 31 is heated sufficiently to deflect and open contacts 32, 33. This places relay coil 22 in effective and non-shunted series relation between terminal 24 and the lamp SL–1. The relay armature 25 is activated and a repetitive striking action initiated against spring 21 until latch 15 is so released that switch 10 returns to neutral. In the event that latch 15 is not released by the first blow of the activated relay armature, then the cycling of the flasher causes an intermittent repetitive striking action of the relay armature against the spring. A similar operation occurs when switch 10 is operated to connect lamp SL–2 in circuit.

Should the brakes be applied, heating winding 35 is shunted by switch BS so that the thermostatic cancelling action does not start until the brakes are released. Thereby, the signal lamp keeps flashing if the vehicle is standing for example as when waiting to make a left turn.

Fig. 2 illustrates the cancelling arrangement as incorporated in a combined turn signal and flare switch of the type shown in my United States Patents Nos. 2,667,603 and 2,667,627. In this figure, the same reference characters have been employed to designate parts identical with those of Fig. 1.

Referring to Fig. 2, the turn signal switch includes an oscillatable selector lever 40 and a reciprocable flare lever 45, both provided with sloping cam surfaces arranged to engage and operate signal switches 50, 50' spring biased toward the cam surfaces. Lever 40 is oscillatable about pivot 41 to selectively engage either switch 50 or 50', whereas lever 45 has a slot for reciprocation to simultaneously operate both switches 50 and 50'.

The vehicle is illustrated as provided with a known form of reciprocable headlamp control switch having a battery tap 42, tail lamp tap 43, parking lamp tap 44 and head lamp tap 46. In the first "on" position, the parking and tail lamp taps are connected to the battery and, in the second "on" position, the head and tail lamp taps are connected to battery.

Switches 50, 50' are connected in circuit between switch HLS and parking lamps LPL, RPL and tail lamps LTL, RTL, and also in circuit between brake switch BS and stop or brake lamps LBL and RBL. Thus, the usual vehicle lamps, except the head lamps, are under the conjoint control of switch HLS and switches 50, 50', or of these latter switches and switch BS. This arrangement provides for the parking and brake lamps on one side of the vehicle to be flashed as turn signal lamps, with the tail lamp on the same side cut out to increase the signalling effect of the stop lamp. At the same time, the parking, tail, and brake lamps on the opposite side are kept under their normal control by switches HLS and BS.

As the switches 50 and 50' are identical in construction and operation, only switch 50 will be described in detail. Switch 50 carries on one side edge a conductive strip 51 normally engaged with contact 52, connected to parking lamp tap 44, and contact 53 connected to left parking lamp LPL. On its opposite side, switch 50 has a contact strip 54 normally engaged with contact 56, connected to tail lamp tap 43, and contact 57 connected to left tail lamp LTL. Thus, in the normal position of switch 50, the left parking and tail lamps are connected to switch HLS.

On one side edge, switch 50 has a third conductive or contact strip 58 normally engaged with contact 59, connected to left brake lamp LBL, and contact 61 connected to terminal 27 of brake switch BS. In the normal position of switch 50, the left brake lamp is thus connected to brake switch BS.

When switch 50 is operated by either lever 40 or lever 45, it is moved to engage strip 51 with a contact 55 connected to contact 33 of thermostatic switch 30, strip 51 disengaging contact 52 but remaining engaged with contact 53. Strip 54 is disengaged from contact 56, but remaining engaged with contact 57. Strip 58 is disengaged from contact 61 but remains engaged with contact 59 and engages contact 60, the latter being connected to contact 33 of switch 30.

Thus, in the operated position of switch 50, lamps LPL and LBL are flashed by flasher FL through switch 30, and lamp LTL is extinguished. A similar effect takes place when switch 50' is operated.

It should be noted that lever 40 operates only one switch 50 or 50' at a time, while flare lever 45 operates both switches 50, 50' simultaneously to flash both parking lamps and both brake lamps. When the flare lever 45 is operated, for example, to indicate an emergency or like condition, both stop lights LBL and RB1 are connected into a flashing circuit, and winding 35 becomes an "open circuit" winding, incapable of developing heat, and the time delay function of the device becomes ineffective for such period as the flare lever is maintained in operation.

The operation of switch 30, heating winding 35, relay 20 and latch 15 in cancelling the signal indication after a pre-set interval is the same as previously described. Latch 15 is normally engaged in a shallow depression 65 in the arcuate outer end of lever 40, and engages either of a pair of notching recesses 66 in the operated positions of lever 40.

While specific embodiments of the invention have been shown and described in detail to illustrate the application of the invention principles, it will be understood that the invention may be embodied otherwise without departing from such principles.

What is claimed is:

1. In combination: a switch movable between an off position and an operated position; means biasing said switch to the off position; a latch engageable with said switch in the operated position; spring means biasing said latch to the latching position; a relay having a core, a winding on said core, and an armature movable relatively to said core; said armature, when said coil is energized, striking said spring means to release said latch from said switch; a first circuit closed in the operated position of said switch and including a source of electric potential, a cyclically operable circuit interrupter, a thermostatic switch, said first-named switch and said load, in series; said thermostatic switch opening after a pre-set heating interval thereof; and an electric heating means for said thermostatic switch connected to said source upon movement of said first-named switch to the operated position; said relay coil being connected in shunt with said thermostatic switch whereby, after a pre-set interval following movement of said first switch to the operated position, said thermostatic switch will open to remove the shunt from said coil for intermittent effective energization of the latter through said circuit interrupter to repetitively reciprocate said armature to strike said spring means to release said latch for movement of said first-named switch to the off position.

2. The combination claimed in claim 1 including means selectively operable to shunt said heating means to delay operation of said thermostatic switch.

3. An automotive vehicle signalling system comprising, in combination a pair of turn signal lamps; a flasher having an input terminal connected to the vehicle source of electric potential, and a main output terminal; a normally closed thermostatic switch connected to said main output terminal; a selector switch, including a movable operator, movable from a neutral position to either of a pair of operated positions, said selector switch, in either operated position, connecting one of said lamps to said thermostatic switch; means biasing said selector switch to the neutral position; a latch engageable with said operator in either operated position to latch said selector switch; spring means biasing said latch to the latching position; a relay having a core, a winding on said core, and an armature movable relatively to said core; said armature, when said coil is energized, striking said spring means to release said latch from said switch; said relay coil being connected in shunt with said thermostatic switch; and an electric heating means for said thermostatic switch to said main output terminal connected to said source upon movement of said selector switch to either operated position; whereby, after a pre-set interval following movement of said first switch to the operated position, said thermostatic switch will open to remove the shunt from said coil for intermittent effective energization of the latter by said flasher to move said armature intermittently to strike said spring means to release said latch for movement of said first-named switch to the off position.

4. An automotive vehicle signalling system comprising, in combination a pair of turn signal lamps; a flasher having an input terminal connected to the vehicle source of electric potential, and a main output terminal; a normally closed thermostatic switch connected to said main output terminal; a selector switch, including a movable operator, movable from a neutral position to either of a pair of operated positions, said selector switch, in either operated position, connecting one of said lamps to said thermostatic switch; means biasing said selector switch to the neutral position; a latch engageable with said operator in either operated position to latch said selector switch; spring means biasing said latch to the latching position; a relay having a core, a winding on said core, and an armature movable relatively to said core; said armature, when said coil is energized, striking said spring means to release said latch from said switch; said relay coil being connected in shunt with said thermostatic switch; and a heating winding for said thermostatic switch connected to said source upon movement of said selector switch to either operated position; whereby, after a pre-set interval following movement of said first switch to the operated position, said thermostatic switch will open to remove the shunt from said coil for intermittent effective energization of the latter by said flasher to move said armature intermittently to strike said spring means to release said latch for movement of said first-named switch to the off position.

5. The combination claimed in claim 3 including means selectively operable to shunt said heating means to delay operation of said thermostatic switch.

6. An automotive vehicle signalling system comprising, in combination, a pair of turn signal lamps; a flasher having an input terminal connected to the vehicle source of electric potential, a main output terminal, and a pilot terminal; a normally closed thermostatic switch connected to said main output terminal; a selector switch, including a movable operator, movable from a neutral position to either of a pair of operated positions, said selector switch, in either operated position, connecting one of said lamps to said thermostatic switch; means biasing said selector switch to the neutral position; a latch engageable with said operator in either operated position to latch said selector switch; spring means biasing said latch to the latching position; a relay having a core, a winding on said core, and an armature movable relatively to said core; said armature, when said coil is energized, striking said spring means to release said latch from said switch; said relay coil being connected in shunt with said thermostatic switch; and a heating winding for said thermostatic switch connected to said pilot terminal; whereby, after a pre-set interval following movement of said first switch to the operated position, said thermostatic switch will open to remove the shunt from said coil for intermittent effective energization of the latter by said flasher to move said armature intermittently to strike said spring means to release said latch for movement of said first-named switch to the off position.

7. An automotive vehicle signalling system comprising, in combination, a pair of turn signal lamps; a flasher having an input terminal connected to the vehicle source of electric potential, a main output terminal, and a pilot terminal; a normally closed thermostatic switch connected to said main output terminal; a selector switch, including a movable operator, movable from a neutral position to either of a pair of operated positions, said selector switch, in either operated position, connecting one of said lamps to said thermostatic switch; means biasing said selector switch to the neutral position; a latch engageable with said operator in either operated position to latch said selector switch; spring means biasing said latch to the latching position; a relay having a core, a winding on said core, and an armature movable relatively to said core; said armature, when said coil is energized, striking said spring means to release said latch from said switch; said relay coil being connected in shunt with said thermostatic switch; a heating winding for said thermostatic switch connected to said pilot terminal and to the vehicle brake lamps; whereby, after a pre-set interval following movement of said first switch to the operated position, said thermostatic switch will open to remove the shunt from said coil for intermittent effective energization of the latter by said flasher to move said armature intermittently to strike said spring means to release said latch for movement of said first-named switch to the off position and, when the brakes are applied to close the brake lamp switch, said heating winding will be shunted to delay operation of said thermostatic switch until after the brakes are released.

References Cited in the file of this patent

UNITED STATES PATENTS

| | | |
|---|---|---|
| 2,535,384 | Batt | Dec. 26, 1950 |
| 2,562,271 | Hollins | July 31, 1951 |
| 2,562,275 | Hollins | July 31, 1951 |
| 2,667,603 | Hollins | Jan. 26, 1954 |
| 2,667,627 | Hollins | Jan. 26, 1954 |
| 2,706,807 | Hollins | Apr. 19, 1955 |
| 2,706,808 | Hollins | Apr. 19, 1955 |
| 2,706,809 | Hollins | Apr. 19, 1955 |
| 2,717,331 | Hollins | Sept. 6, 1955 |
| 2,724,102 | Hollins | Nov. 15, 1955 |
| 2,757,315 | Hollins | July 31, 1956 |